(12) United States Patent
Brett

(10) Patent No.: US 12,168,870 B2
(45) Date of Patent: Dec. 17, 2024

(54) CONSTRUCTION AND METHOD FOR GENERATING A CONSTRUCTION

(71) Applicant: Tobias Brett, Schönefeld (DE)

(72) Inventor: Tobias Brett, Schönefeld (DE)

(73) Assignee: Tobias Brett, Schönefeld (DE)

(*) Notice: Subject to any disclaimer, the term of this patent is extended or adjusted under 35 U.S.C. 154(b) by 80 days.

(21) Appl. No.: 17/761,113

(22) PCT Filed: Sep. 8, 2020

(86) PCT No.: PCT/EP2020/075125
§ 371 (c)(1),
(2) Date: Mar. 16, 2022

(87) PCT Pub. No.: WO2021/052823
PCT Pub. Date: Mar. 25, 2021

(65) Prior Publication Data
US 2022/0333377 A1 Oct. 20, 2022

(30) Foreign Application Priority Data

Sep. 17, 2019 (DE) .......................... 102019125041.2
Nov. 8, 2019 (DE) .......................... 102019130150.5

(51) Int. Cl.
*E04B 2/84* (2006.01)
*E02D 29/02* (2006.01)
(Continued)

(52) U.S. Cl.
CPC ............ *E04B 2/8635* (2013.01); *E02D 29/02* (2013.01); *E04H 17/20* (2013.01); *F21V 7/0008* (2013.01);
(Continued)

(58) Field of Classification Search
CPC ... E02D 29/02; E02D 29/0208; E04B 2/8635; E04H 17/20; F21V 7/0008; F21V 33/006;
(Continued)

(56) References Cited

U.S. PATENT DOCUMENTS 4,818,150 A * 4/1989 Jaecklin ................. E02D 29/02
  405/262
6,233,005 B1   5/2001 Cornillault et al.
(Continued)

FOREIGN PATENT DOCUMENTS

AT         505253 A2    12/2008
CN       201648879 U    11/2010
(Continued)

OTHER PUBLICATIONS

International Search Report and Written Opinion for International Application No. PCT/EP2020/081403 mailing date Apr. 20, 2021.
(Continued)

*Primary Examiner* — Frederick L Lagman
*Assistant Examiner* — Stacy N Lawson
(74) *Attorney, Agent, or Firm* — MARSHALL, GERSTEIN & BORUN LLP

(57) ABSTRACT

Structures, particularly wall and/or pillar structure, comprising a supporting portion and a covering portion for covering the supporting portion, the supporting portion being provided by solid material pieces and at least one string for jamming at least some of the solid material pieces, wherein the covering portion comprises at least one covering device and wherein the string and the covering device are attached to each other.

18 Claims, 10 Drawing Sheets

(51) Int. Cl.
  *E04B 2/86* (2006.01)
  *E04H 17/20* (2006.01)
  *F21V 7/00* (2006.01)
  *F21V 33/00* (2006.01)

(52) U.S. Cl.
  CPC ...... *F21V 33/006* (2013.01); *B01D 2253/106* (2013.01); *B01D 2253/1124* (2013.01); *B01D 2253/304* (2013.01); *B01D 2257/504* (2013.01)

(58) Field of Classification Search
  CPC ...... B01D 2253/106; B01D 2253/1124; B01D 2253/304; B01D 2257/504
  See application file for complete search history.

(56) References Cited

U.S. PATENT DOCUMENTS

| | | | |
|---|---|---|---|
| 7,641,461 B2 | 1/2010 | Khoshnevis | |
| 10,577,810 B2 | 3/2020 | Telleria et al. | |
| 2008/0247685 A1* | 10/2008 | Kim | E02B 3/127 405/284 |
| 2010/0012004 A1* | 1/2010 | Telander | B32B 5/024 428/328 |
| 2018/0023267 A1* | 1/2018 | Ladkat | E02D 29/0216 405/284 |
| 2018/0071949 A1 | 3/2018 | Giles | |
| 2018/0326507 A1 | 11/2018 | Halvorsen et al. | |
| 2020/0171656 A1 | 6/2020 | Diankov | |
| 2020/0256051 A1 | 8/2020 | Becerril Hernández | |
| 2021/0072727 A1 | 3/2021 | Stanger | |
| 2022/0198085 A1 | 6/2022 | Kornaat | |

FOREIGN PATENT DOCUMENTS

| | | | | |
|---|---|---|---|---|
| CN | 201665934 U | 12/2010 | | |
| CN | 207739389 U | 8/2018 | | |
| EP | 2317013 A1 | 5/2011 | | |
| FR | 2919322 A1 | 1/2009 | | |
| GB | 302101 A | 12/1928 | | |
| IT | VI20090265 A1 | 4/2011 | | |
| JP | H0455508 A | 2/1992 | | |
| JP | H0551935 A | 3/1993 | | |
| JP | H06108437 A | 4/1994 | | |
| JP | H0653631 U | 7/1994 | | |
| JP | H0657940 U | 8/1994 | | |
| JP | H08-184065 A | 7/1996 | | |
| JP | H1018317 A | 1/1998 | | |
| JP | 2008280691 A | 11/2008 | | |
| JP | 2011153441 A | 8/2011 | | |
| KR | 200330335 Y1 | 10/2003 | | |
| KR | 20070077549 A | 7/2007 | | |
| KR | 100955728 B1 | 5/2010 | | |
| KR | 101290272 B1 | 7/2013 | | |
| KR | 20150019313 A | 2/2015 | | |
| WO | WO-2006090195 A1 * | 8/2006 | .......... | E04F 13/0808 |
| WO | WO-2008/070913 A1 | 6/2008 | | |
| WO | WO-2009044002 A1 | 4/2009 | | |
| WO | WO-2018/009985 A1 | 1/2018 | | |
| WO | WO-2019/038491 A1 | 2/2019 | | |

OTHER PUBLICATIONS

Lussi Manuel et al, Accurate and Adaptive In Situ Fabrication of an Undulated Wall using an On-Board Visual Sensing System, 2018 IEEE International Conference on Robotics and Automation (ICRA), May 21-25, Brisbane, Australia, pp. 3532-3539.

Aejmelaeus-Lindström Petrus et al, Jammed architectural structures: towards large-scale reversible construction, Granular Matter, Springer-Verlag Berlin Heidelberg, Apr. 8, 2016, 18:28, pp. 1-12.

Search Report for corresponding German Patent Application No. DE 10 2019 130 150.5, dated Sep. 4, 2020.

Chinese Patent Application No. 202080079776.0, Office Action, issued Sep. 5, 2023.

International Search Report and Written Opinion for Corresponding International Application No. PCT/EP2020/075125 mailing date Feb. 16, 2021.

Lloret et al., Complex concrete structures merging existing casting techniques with digital fabrication, Computer-Aided Design, 60:40-9 (Mar. 2014).

European Patent Application No. 20807300.7, Communication Pursuant to Rule 164(2)(b) and Article 94(3) EPC, dated Sep. 2, 2024.

Rock Print Pavilion, Gewerbemuseum Winterthur, downloaded from the Internet at: <https://www.gewerbemuseum.ch/ausstellungen/rock-print-pavilion>, Apr. 11, 2018.

Japanese Patent Application No. 2022-517140, Notice of Reasons for Rejection, mailed Jun. 17, 2024.

* cited by examiner

CONSTRUCTION AND METHOD FOR GENERATING A CONSTRUCTION

CROSS REFERENCE TO RELATED APPLICATIONS

This Application is a U.S. National Stage of International Patent Application No. PCT/EP2020/075125 filed Sep. 8, 2020, which claims the benefit of priority from Germany Patent Application No. 102019130150.5 filed on Nov. 8, 2019 and Germany Patent Application No 102019125041.2 filed on Sep. 17, 2019, the respective disclosures of which are each incorporated herein by reference in their entireties.

TECHNICAL FIELD

The present invention refers to a construction, particularly to a wall and/or pillar structure. The invention likewise refers to a covering device and to a method for generating a construction.

BACKGROUND

The concrete industry is responsible for a high amount of $CO_2$ emissions. Constructions, such as walls, for framing land or properties are often built with large amounts of concrete. Concrete constructions, particularly concrete walls, also require a solid foundation and cannot be built on normal soil ground. Accordingly, the building of concrete constructions is regularly associated with high costs. In addition to this, the components of such constructions cannot directly be reused as they need to be recycled. If natural stones are used, their value may be reduced after disassembly, as they are contaminated with concrete residues.

An alternative to conventional concrete constructions are so called "Jammed Architectural Structures". Such constructions may be made of stone fractions or crushed stones being jammed together by pressure and vibration or shaking process. The so called jamming effect may be increased by the use of a string, which may be unwound during the building process throughout the stone structure.

However, the use of a string may enhance the jamming effect only to a limited extent, and unintended deteriorations of such constructions may still not be prevented. Single stone pieces or also a plurality of stone pieces may break out or detach from the construction despite the use of a string. Further to this, such "Jammed Architectural Structures" may be recognized as having a rather low aesthetic appearance, which may be further affected in case a string is used for enhancing the jamming effect.

SUMMARY

In view of the above, it has been an object of the present invention to provide a construction, such as a wall and/or pillar structure, which has high mechanical properties and which at the same time may be provided and also disassembled with only little effort. It has also been an object of the present invention to provide a method for generating a construction.

A construction according to the present invention may particularly be a wall and/or pillar structure, but is not limited thereto. A construction according to the present invention may generally refer to different types, forms and sizes of architectural structures. Particularly, a construction according to the present invention may be an enclosure for the yard of a property, such as a front yard and/or back yard.

A construction according to the present invention comprises a supporting portion and a covering portion for covering the supporting portion, the supporting portion being provided by solid material pieces and at least one string for jamming at least some of the solid material pieces. According to the present invention, the covering portion comprises at least one covering device, wherein the string and the covering device are attached to each other.

The supporting portion itself may already provide a certain degree of mechanical stability due to the jamming effect, which may particularly be enhanced due to the use of a string. Now, by providing a covering portion with at least one covering device, the outer appearance of the construction may be improved. The string and/or the solid material pieces of the supporting portion may be suitably covered by the covering portion, and therefore less visible or entirely covered.

At the same time, the providing of the covering portion and the attachment of the at least one covering device to the string, allows to further improve the mechanical properties and durability of the construction. The covering portion with the at least one covering device may further enhance the jamming effect within the supporting structure, and particularly prevent single solid material pieces to break out or detach out of the supporting portion. Accordingly, it may also be avoided that loose string portions would hang out of the construction. This reduces the risk of unintended deteriorations or disassembly processes. Due to the attachment of the string with the at least one covering device, the covering device may be suitably held in place and also provide holding support for at least some of the solid material pieces of the supporting structure.

According to the present invention, the term "string" is not limited to textile, synthetic or metallic strings, but may refer to every kind of elongated flexible attachment means. For example, a "string" within the meaning of the present invention may likewise refer to a flexible cable, chain, belt, and/or strap, synthetic fibre or carbon fibre strings, or the like.

According to a preferred embodiment of the present invention, the construction may be a dry construction, particularly a dry wall system or dry pillar system. The assembly or generation process may therewith be facilitated as no water adding and drying steps are required.

According to a further preferred embodiment, may be configured for disassembly, at least for part-disassembling, by pulling out the string of the supporting portion. In particular, the construction may be configured for disassembly by reversing the assembly process. The quality and/or usability of the single construction components may therefore be maintained also after disassembly. Furthermore, disassembly may be favourable if cleaning the construction does not compensate aging effects, e.g. cleaning equipment does not reach into gaps or pores of solid material pieces or covering devices. Disassembly can then enable individual cleaning of each component until the aging effects are suitably removed.

According to a further preferred embodiment, the supporting portion and/or covering portion may be arranged and/or assembled on soil ground and/or grassland. Also, the supporting portion and/or covering portion may be configured for self-restructuring, particularly in case of ground movements, such as movements due to frost and/or heavy rain. In case of large displacements with unfavourable optical effects, the respective construction segment may be disassembled and rebuild.

Furthermore, the supporting portion and/or covering portion may at least section wise be arranged and/or assembled within soil ground and/or below the ground surface and/or within a hole in soil ground, preferably below the frost line. Therewith, the construction may replace a basement or groundwork of an architectural structure, particularly in case of intense ground movements.

According to a further preferred embodiment, the supporting portion and/or covering portion may be configured for automated and/or manual generation, assembly and/or disassembly and/or for the generation, assembly and/or disassembly with robot equipment.

According to a further preferred embodiment, the covering portion is arranged around the supporting portion and/or on a plurality of sides of the supporting portion. The covering portion may provide a cast for the supporting portion, particularly a cast for a compound of the solid material pieces and the string of the supporting portion. The mechanical properties and durability of the construction as well as the outer appearance may thereby be further improved. By providing a cast, the building of the supporting structure may furthermore be facilitated.

According to a yet further preferred embodiment, the at least one covering device may be made from a different material and/or may have a different optical appearance than at least some of the solid material pieces of the supporting structure. The covering device may accordingly be chosen in view of appearance criteria.

The at least one covering device may have a larger size than the average solid material piece of the supporting structure. The at least one covering device may accordingly have an improved holding functionality or cast functionality for the solid material pieces of the supporting portion.

Furthermore, the at least one covering device may have a rounded shape and/or be free of edges or sharp portions. The covering device may therefore also be made from a material and/or have a shape being unsuitable for jamming.

According to a yet further preferred embodiment, the solid material pieces may be provided as crushed rocks, angular rocks, granular stone material and/or broken stones. Such material may be provided with only little costs and has a high durability. It is also possible that the solid material pieces may be provided as glass material and/or glass gravel and/or glass chippings. This may prove beneficial for illumination purposes.

According to a yet further preferred embodiment, the solid material pieces may be jammed and/or stamped and/or compressed, preferably for increasing a jamming effect. The stability of the supporting portion may thereby be further improved.

According to a yet further preferred embodiment, the string is at least section wise laid within and/or throughout the supporting portion and/or between the solid material pieces and/or loosely laid and/or at least section wise tightened, preferably for increasing a jamming effect. Thereby, the mechanical properties and durability of the supporting portion may further be enhanced.

It is furthermore possible that the string is arranged in a pattern alternatingly running between a central area of the supporting portion and different covering devices. The contribution of the string to the jamming effect within the supporting portion may thereby be further improved.

Preferably the string is at least section wise laid within and/or throughout the supporting portion in a non-linear fashion and/or at least section wise in a curved fashion and/or bended or curved at least section wise around the solid material pieces. Likewise it is possible that string is flexible and/or limp in a non-tensioned state and/or wherein the string remains at least section wise curved and/or bended in a tensioned state in order to provide and/or improve a jamming effect.

According to a yet further preferred embodiment, the covering portion may comprise a plurality of covering devices, preferably arranged adjacent to each other and/or along and/or adjacent to the supporting portion. A larger surface may thereby be covered and/or a larger cast for the supporting portion be provided. The string may be attached to a plurality of covering devices, preferably to a plurality of covering devices on different sides of the supporting portion. The overall stability of the construction may be further improved in this manner.

According to a yet further preferred embodiment, the at least one covering device may be made of and/or comprises a stone and/or glass and/or metal material. Such materials may provide an aesthetic appearance, while at the same time allowing a sufficient holding functionality for the supporting portion, particularly a stable cast for the supporting portion.

According to a yet further preferred embodiment, the at least one covering device may comprise a visible side facing away from the supporting portion and/or a functional side facing the supporting portion, wherein the string is attached to the covering device at the functional side. The functional side may therefore be specifically designed for the attachment of the string, and the visible side be designed or provided for an improved or high quality appearance.

According to a yet further preferred embodiment, the solid material pieces may be compressed and/or stamped against the covering portion and/or against the at least one covering device and/or while being held and/or limited by the at least one covering device. The degree of compression and/or the jamming effect may thereby be further increased, and the string may accordingly be tightened thereby. The overall mechanical properties may thus be further improved.

According to a yet further preferred embodiment, the covering portion may allow shifting and/or movements of the solid material pieces. A mechanically stable arrangement of the single solid material pieces may thereby be achieved.

According to a yet further preferred embodiment, the covering portion and/or the at least one covering device may be fixed and/or held by the supporting portion, preferably by the compressed and/or stamped and/or jammed solid material pieces and/or by the string and/or by a compound made of the solid material pieces and the string. A mechanically stable arrangement of the covering portion and/or the at least one covering device may thereby be achieved.

According to a yet further preferred embodiment, the attachment between the string and the at least one covering device is provided via a form fit and/or non-positive connection and/or via an adhesive. Such attachment may provide a high degree of reliability and therewith further improve the long term stability of the construction.

According to a yet further preferred embodiment, the at least one covering device may comprise at least one outer component or a plurality of outer components and at least an attachment element and/or attachment portion for the attachment with the string. The outer component may preferably comprise a visible side facing away from the supporting portion and/or a functional side facing the supporting portion. The attachment element and/or attachment portion may be arranged on the functional side. Accordingly, the attachment element and/or attachment portion may not be visible from the outside or covered by the outer component of the covering device. The outer appearance of the construction may thereby be further improved.

According to a yet further preferred embodiment, the attachment element and/or attachment portion may be configured as a hook and/or eye and/or notch, to which the string is attached and/or hooked. Such an attachment element and/or attachment portion may be provided with only little costs and may provide a secure and long-lasting attachment. Furthermore, an attachment between the string and such attachment element and/or attachment portion may be established with only little effort.

More preferably, the attachment element and/or attachment portion may be configured as and/or comprise a screw, wherein the screw is preferably configured as a concrete screw. Such a screw may be provided at only little cost.

Furthermore, the screw may be screwed into the outer component and/or screwed into the outer component free of any dowel or screw anchor. This may be achieved with only little effort.

The screw may comprise a shaft and a screw head attached to the shaft. The shaft may comprise a protrusion, particularly a radial protrusion, being arranged at a distance from the screw head in a longitudinal direction of the shaft, wherein the shaft and/or the protrusion and/or the screw head may provide a gripping portion for a robot and/or gripping device. This allows facilitated handling operations.

More preferably the screw head and/or the protrusion may be provided with insertion chamfers and/or rounded surfaces and/or wherein insertion chamfers and/or rounded surfaces of the protrusion and the screw head may face each other in the longitudinal direction of the shaft. The insertion chamfers and/or rounded surfaces may be provided for accurate and/or facilitated gripping and alignment of the covering device by a robot or gripping device. The risk of material crushed or high material stresses due to automated gripping procedures may thereby be reduced.

Furthermore, the attachment element and/or attachment portion may comprise a disc for engagement by the string. The disc may comprise a plurality of teeth arranged on the outer circumference of the disc, wherein the teeth may be configured for engagement and/or locking and/or trapping engagement with the string.

The disc may preferably be arranged on the shaft of a screw, preferably at distance from the outer component and/or between the outer component and the screw head and/or between the outer component and the protrusion. The string may thus slide into a gap between the outer component and the disc, and when pulled due to a jamming procedure, may be engaged with teeth of the disc with sufficiently high probability.

According to a yet further preferred embodiment, at least two surface components may be attached together via an interconnection, wherein the interconnection preferably provides an attachment element and/or an attachment portion, to which the string attached and/or hooked. The overall effort for generating the construction and/or providing the attachment between the string and the covering devices may be reduced in this way.

It may further prove beneficial when the at least one covering device comprises an identification device, preferably arranged on an attachment element and/or attachment portion. Such identification device may preferably be configured as flat platform and/or for detection by a sensor or visible for a human and/or configured with a position and/or orientation marker and/or a data code or device ID. This allows an easy identification and also the possibility of tracking single covering devices. This may facilitate the generation of the construction, for example, in order to ensure the correct location of single covering devices, and also replacements of single covering devices.

Preferably, the at least one covering device may comprise a shielding portion and/or shielding element arranged on a functional side facing the supporting portion. The shielding portion and/or shielding element may be configured for maintaining a distance between the solid material pieces of the supporting portion and an outer component of the covering device. Accordingly, a free space may be provided between the supporting portion and the outer component of the covering device.

The shielding element and/or shielding portion may be arranged and/or fixed on the attachment element and/or attachment portion of the covering device. Such arrangement or fixation of the element and/or shielding portion may reliably be provided with also only little effort.

According to a yet further preferred embodiment, at least one illuminant, preferably a plurality of illuminants and/or a light chain, may be arranged in a free space between the supporting portion and a visible outer surface of the covering portion, preferably in a free space between the shielding portion or shielding element and the outer component of the covering device. The construction may therewith be further improved in view of an aesthetic appearance and also provide an illumination functionality for the surrounding of the construction, for example for a path or footway along the construction.

Preferably, a plurality of illuminants may be configured to show a light pattern. Such light patterns may be configured for continuous and/or periodic changes, which may further improve the outer appearance or illumination functionality.

Furthermore, a plurality of covering devices may be arranged in a pattern, preferably a predefined and/or optical and/or colour and/or design and/or picture pattern, and/or in a pattern of different stone types, preferably with different aging and/or weathering characteristics, and/or in a pattern with different transparencies and/or translucencies. The possibilities of achieving different design and appearance effects may thereby be further enhanced.

According to a yet further preferred embodiment, two adjacent covering devices may be arranged at a distance from each other and/or a gap may be provided between two adjacent covering devices. Accordingly, a space between two adjacent covering devices and/or between an outer component of a covering device and a shielding component or shielding portion may be visible from the outside, which may be aesthetic, for example, in case of the arrangement of plants or the like within the construction. Also light may shine through such gaps between two adjacent covering devices.

According to a yet further preferred embodiment, the covering portion may comprise a plurality of covering devices and at least some of the covering devices may be arranged in an overhanging configuration and/or overhanging over at least one of the covering devices below. The centre of gravity of an overhanging covering device may be arranged for holding the overhanging covering device in place, preferably also free of any connection to the string. The placement of the overhanging covering device prior to the attachment to the string may thereby be facilitated. Overhanging configurations may allow more complex geometrical overall designs of the construction, and therewith improve the functionality of the construction.

According to a yet further preferred embodiment, a plurality of segments of the supporting portion and/or the covering portion may be provided, the segments being provided independently from each other and/or configured for independent disassembly. It may therefore be possible to refurbish and/or replace selected portions of the constructions, and to maintain different portions. The long term maintenance effort may therewith be reduced.

According to a yet further preferred embodiment, the supporting portion and/or the covering portion may comprise degradable objects, preferably organic material for the development of holes, channels, cavities and/or animal living space. The construction may therewith be well integrated into a natural environment, and also have a positive effect on the surrounding natural environment.

According to a yet further preferred embodiment, the supporting portion and/or the covering portion may enclose and/or comprise at least one functional object, preferably a pipe, pipe segments, a cable, a rigid structure and/or steel bar, which may allow to further improve the functionality and/or stability of the construction. For example, a pipe or cable may allow electrical installations or water installations in or close to the constructions. Steel bars may improve mechanical properties.

Furthermore, the supporting portion and/or the covering portion may enclose a structure connected and/or founded and/or embedded within the respective ground or soil. The string may be connected to a structure connected and/or founded and/or embedded within the respective ground or soil. The mechanical overall properties may further be enhanced. Particularly, the construction may be secured against an unintended tilting relative to the ground or soil.

According to a yet further preferred embodiment, the supporting portion and/or the covering portion may comprise printed structures, preferably 3D-printed structures and/or watertight printed structures and/or printed water storages for plants and/or electrical devices. The functionality of the construction may thereby be advantageously extended, particularly in view of environmental improvements or electrical applications. In general, the supporting portion and/or the covering portion may comprise a watertight portion, preferably for the arrangement or positioning of plants and/or electrical devices.

According to a yet further preferred embodiment, the covering portion may comprise a metal flange, preferably a metal flange mounted to the supporting portion and/or mounted to the supporting portion subsequent to the building of the supporting portion. Such a metal flange may be mounted by at least one hook being inserted into the supporting portion. Such a metal flange may not be attached to the string or also attached to the string. In the region of such metal flange, the supporting portion may be built closer to the outside surface of the entire construction.

According to a yet further preferred embodiment, the covering portion may comprises a top cover portion covering at least the supporting portion from an upper side and/or being positioned on top of a vertically extending side cover portion of the covering portion. The top cover portion may be a 3D printed structure and/or printed as a negative form of the upper surface of the supporting structure and/or the upper surface of the side cover portion. The stability of the construction may thereby be further improved and weathering effects reduced.

According to a yet further preferred embodiment, the top cover portion may be configured to fix and/or receive solid material pieces of the supporting portion and/or covering devices of a vertically extending side cover portion of the covering portion. The top cover portion may have recesses matching to the upper surface of the supporting portion and/or the upper surface of the vertical side cover portion. The top cover portion may be configured as a flat platform, preferably for installation of a roof and/or a light or illumination.

According to a yet further preferred embodiment, the top cover portion may be transparent, translucent and/or from a glass material and/or from frosted glass material. A light source or illumination may be installed on top of the top cover portion in order to illuminate the supporting portion. The outer appearance of the construction may thus be improved, as reflected light may shine out of the supporting portion.

According to a yet further preferred embodiment, a mirror may be installed on top of the supporting portion and/or on top of the top cover portion and/or on top of a light source or illumination, preferably for reflecting light into the supporting portion. Furthermore, the mirror may have overhanging portions and/or may be wider than the total thickness of the supporting portion and covering portion, preferably for reflecting light into the supporting portion along an inner optical path and/or for reflecting light onto the covering portion from the outside, particularly along a light path extending at least section wise outside the covering portion. The overall lighting effect may further be improved in this manner.

According to a yet further preferred embodiment, a light source or illumination source may be attached on top of a post being attached to and/or embedded within the ground or soil and/or wherein wires for the light source or illumination source are connected to the post and/or wherein the light reflecting mirror is attached to the post via at least a screw hole within the post. Such a post may thus not only improve the overall stability of the construction, but at the same time provide attachment functions for specific components of the construction.

According to a yet further preferred embodiment, the supporting portion and/or the covering portion may enclose a fence, preferable a fence comprising a double rod mat attached by clamping elements to a solid pile arranged within the respective soil or ground. Such fences are commonly known and may therefore be enclosed by a supporting portion and/or covering portion with only little effort.

According to a yet further preferred embodiment, vertically extending supporting elements are attached to the double rod mat. Said supporting elements may be configured for supporting solid material pieces of the supporting and transferring their weight load to the double rod mat of the fence. Thereby a specific load distribution within the construction may be achieved.

According to a yet further preferred embodiment, the vertically extending supporting elements are provided by a weatherproof upper portion and a dissolving or degradable lower portion, the dissolving or degradable lower portion being configured for the development of cavities below the supporting elements for improved weight load transferral to the double rod mat. The supporting portion may therewith be reduced from high loads and at least a certain degree of loads may be transferred via different portions to the ground or respective soil.

Furthermore, the double rod mat of the fence may be attached to the top cover portion for transferring a weight load via the top cover portion to the covering portion, in particular to the side portions of the covering portion.

Furthermore, the supporting portion and/or the covering portion may comprise basalt material and/or dunite or olivine material. Such material may remove carbon dioxide from the atmosphere and therefore may have positive ecological effects.

Furthermore, a plurality of solid material pieces of the supporting portion and/or covering devices of the covering portion may be made of basalt rock and/or dunite or olivine material and/or covered by basalt material and/or dunite or olivine material and/or exposed to air and/or wherein the basalt material and/or dunite or olivine material is exposed to weathering and/or configured for weathering and removing carbon dioxide from the atmosphere.

Furthermore, at least some of the solid material pieces and/or covering devices of the covering portion may be covered with powder of basalt rock and/or dunite or olivine material and/or microparticles of basalt rock and/or dunite or olivine material are exposed to the atmosphere for enhanced weathering.

Furthermore, the basalt powder and/or dunite or olivine powder may have a grain size of more than 5 micrometers, more than 10 micrometers, more than 15 micrometers, more than 17.5 micrometers or more than 20 micrometers and/or a grain size of less than 50 micrometers, less than 40 micrometers, less than 30 micrometers, less than 25 micrometers or less than 22.5 micrometers, more preferably 20 micrometers or about 20 micrometers. The size may refer to the mean size of the powder material.

According to a further embodiment, the basalt powder and/or dunite or olivine material may be attached to the solid material pieces and/or the covering devices of the covering portion by a slurry and/or a gel and/or a glue material.

Furthermore, the slurry and/or gel and/or glue material may be permeable for air and/or configured for dissolving, preferably for dissolving in a timeframe between 6 months and 18 months, preferably about 12 months.

According to a further preferred embodiment, a basalt powder or dunite or olivine powder material may be formed to particles of a size of at least 0.5 mm, preferably more than 1 mm or more than 3 mm or more than 5 mm and/or less than 10 mm and these particles may be arranged within the supporting portion and/or the covering portion.

It may furthermore be beneficial, if the supporting portion and/or the covering portion and/or the top cover portion comprises at least one pipe, filling opening and/or tank for filling rock particles, preferably grinded rock particles, and/or a slurry and/or gel and/or glue material with rock material, more preferably for filling rock particles from basalt and/or dunite and/or olivine.

Furthermore, the at least one pipe, filling opening and/or tank may be configured for filling rock particles at an upper portion of the supporting portion and/or the covering portion and/or the top cover portion and/or for distributing the rock particles throughout the supporting portion and/or the covering portion by a stream of liquid, preferably water.

It may also be beneficial, when the supporting portion and/or the covering portion comprises a filter and/or removal opening for filtering and/or removing rock particles, particularly weathered rock particles, in a lower portion of the supporting portion and/or the covering portion, particularly for removing weathered rock particles from drainage water.

According to a further preferred embodiment, at least one sensors may be provided, preferably arranged within the supporting portion and/or the covering portion, said sensor being configured for detecting the weathering status of rock particles.

Accordingly, grinded rock particles comprising basalt and/or dunite or olivine may be inserted on the upper side of the construction into the supporting portion and/or covering portion and then distributed throughout the supporting portion and/or covering portion by a stream of water from above. The particles may fill the spaces of the covering portion without blocking fresh air from passing through the covering portion.

During a certain time period, for example, one year or three years, the particles may start to dissolve, enable weathering of the basalt rock or dunite or olivine or other materials and all residues may be washed through the covering portion. After said time period, said particles may be removed by collecting them in the lower part of the construction by applying a filter which removes these particles from drainage water.

In a preferred solution, dissolution of the particles may be achieved or enhanced through application of charcoal. Charcoal and rock powder may be mixed, for example in a relationship of 1:1, and then compressed under pressure and heat into the final particle shape. Such particles may be arranged within the supporting portion and/or covering portion.

In another preferred solution, dissolution of the particles may be achieved and/or maintained at a desired rate through application of wood pellets. Rock powder may be added to the wood during pellet production. Natural lining inside of the wood may glue the pellets together and prevent fast dissolution. The benefit for application of charcoal or wood inside of the particles may be that both are a natural source of carbon dioxide during their own weathering process. Thus, rock powder may be enclosed by a natural emitter of carbon dioxide.

According to a yet further preferred embodiment, the supporting portion may at least section wise be made from charcoal as solid material pieces and from a metal wire as a string. Furthermore, the supporting portion and/or the covering portion may at least section wise be configured as a chimney. The construction may, accordingly be used for outside heating purposes and/or for decorative purposes in outside events. Furthermore, a covering device may be configured as a door, preferably a fire resistant door and/or being arranged at a distance from charcoal pieces. Such a door may be opened to more clearly view fire or glowing charcoal pieces and/or conduct adjustments of singe charcoal pieces.

According to a yet further preferred embodiment, an intermediate layer may be arranged between the supporting portion and the covering portion, preferably an intermediate layer of stones. The intermediate layer may be provided by stones or other sold material pieces with a size equal to or larger than a gap between two adjacent covering devices. Stones or material pieces of the intermediate layer may have a round and/or rounded shape. Stones or material pieces of the intermediate layer may be visible through gaps between two adjacent covering devices. Such intermediate layer may again be arranged for aesthetic or appearance reasons. A viewer from the outside may through this be able to see the covering portion as well as an intermediate layer between the covering portion and the supporting portion. Two different types of material layers may thus be recognized.

A further aspect of the present invention refers to a construction, particularly to a wall and/or pillar structure, comprising solid material pieces and a string for jamming said solid material pieces, wherein at least some of the solid material pieces are made from basalt and/or are at least section wise covered by basalt material and/or dunite and/or olivine material.

A further aspect of the present invention refers to a construction, particularly wall and/or pillar structure, comprising a supporting portion and a covering portion for covering the supporting portion, the supporting portion being provided by solid material pieces and at least one string for jamming at least some of the solid material pieces, wherein the covering portion comprises at least one covering device and wherein the string and the covering device are attached to each other and wherein the supporting portion and/or the covering portion comprise basalt material and/or dunite and/or olivine material.

A further aspect of the present invention refers to a method for servicing a construction according to the above description, the method comprising the steps of frequently and/or periodically applying basalt material and/or dunite and/or olivine material to the solid material pieces and/or to covering devices of a covering portion.

A further aspect of the present invention refers to a covering device, preferably for a construction according to the description above, comprising at least one outer component or a plurality of outer components and at least an attachment element and/or attachment portion for the attachment with a string, the attachment element and/or attachment portion being configured as and/or comprising a screw, preferably a concrete screw, being screwed into the outer component, and wherein the attachment element and/or attachment portion comprises a disc for engagement by a string, wherein the disc is arranged on the shaft of the screw and comprises a plurality of teeth arranged on the outer circumference of the disc, wherein the teeth are configured for engagement and/or locking and/or trapping engagement with a string.

The details and/or advantages described above with regard to the construction likewise apply to the covering device for a construction described above.

A further aspect of the present invention refers to a method for generating a construction, preferably a construction according to the above description. The method may comprise the steps of providing a covering portion with at least one covering device, providing a supporting portion by placing a compound of solid material pieces and at least one string adjacent to the at least one covering device, and attaching the string to the at least one covering device.

As mentioned above with regard to the construction, the supporting portion itself may provide a certain degree of mechanical stability due to the jamming effect, which may be enhanced due to the use of a string. By providing a covering portion with at least one covering device, the outer appearance of the construction may be improved. The string and/or the solid material pieces of the supporting portion may be suitably covered by the covering portion, and therefore less visible or entirely covered. Furthermore, the providing of the covering portion and the attachment of the at least one covering device to the string, allows to further improve the mechanical properties and durability of the construction. The covering portion with the at least one covering device may further enhance the jamming effect within the supporting structure, and particularly prevent single solid material pieces to break out or detach out of the supporting portion. It may therefore be avoided that loose string portions would hang out of the construction. The risk of unintended deteriorations or disassembly processes may be reduced. Due to the attachment of the string with the at least one covering device, the covering device may be suitably held in place and also provide holding support for at least some of the solid material pieces of the supporting structure.

According to a preferred embodiment, at least two covering portions and/or at least two covering devices are arranged opposite to each other. The supporting portion may be arranged between at least two opposite covering portions and/or between at least two covering devices.

According to a preferred embodiment, the at least one covering portion may provide a cast for the supporting portion and/or for the compound of solid material pieces and at least one string.

Preferably, the solid material pieces may be jammed by the string and/or by stamping and/or compacting. The overall stability of the supporting portion may thereby be further enhanced.

According to a yet preferred embodiment of the method, the string may at least section wise laid within and/or throughout the supporting portion and/or between the solid material pieces and/or loosely laid and/or at least section wise tightened, preferably for increasing a jamming effect.

According to a yet preferred embodiment of the method, the string is laid in a pattern alternatingly running between a central area of the supporting portion and different covering devices. The jamming effect may thus be further enhanced, particularly ensuring a proper cast or holding functionality provided by the covering portion.

The details and/or advantages described above with regard to the construction and the covering device likewise apply to the method for generating a construction described above.

The features and advantages of the various embodiments of the present invention will, in the following, be described with reference to the Figures.

DETAILED DESCRIPTION

Figure 1:
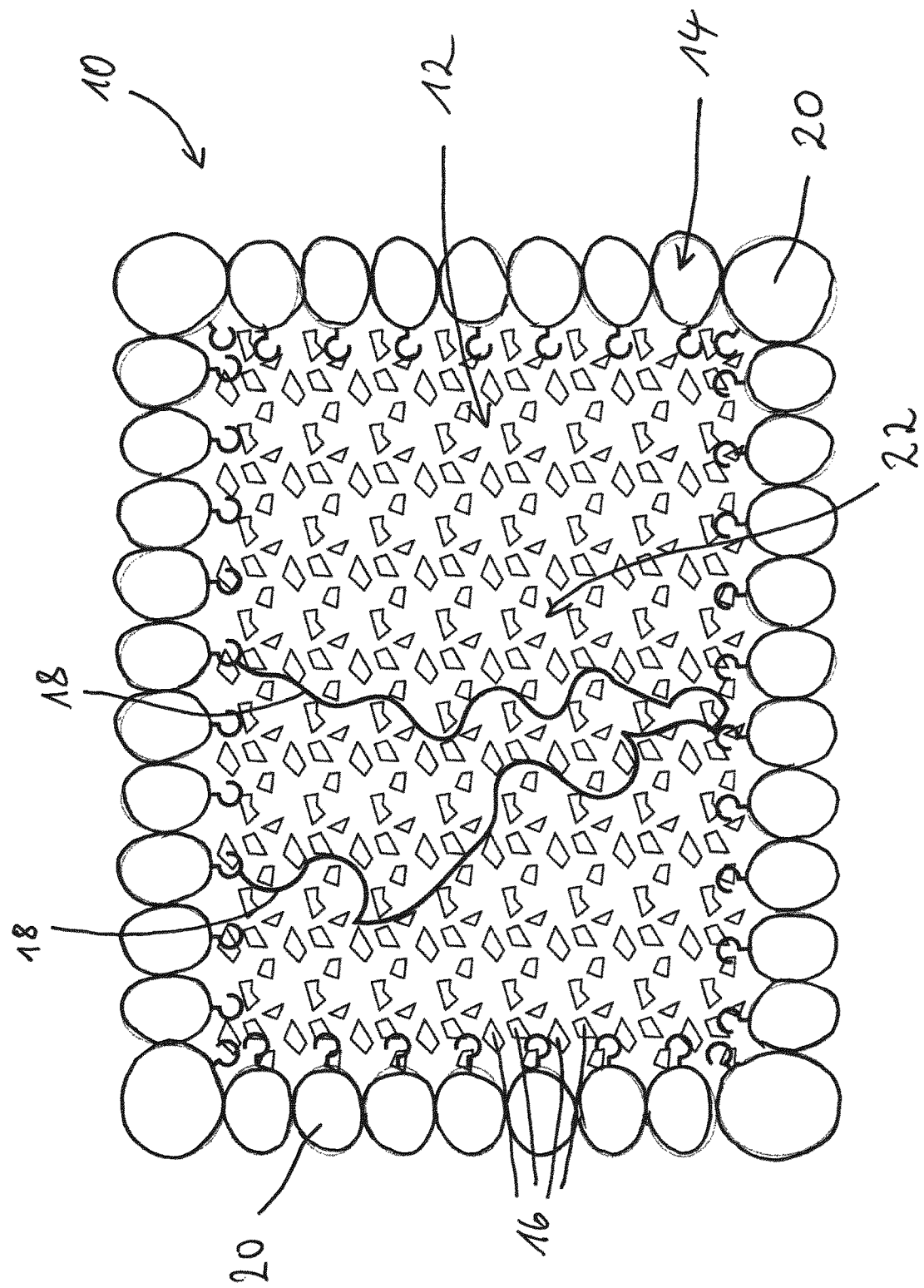
FIG. 1 shows a schematic horizontal cross sectional view of a construction according to an embodiment of the present invention.

FIG. 1 shows a schematic horizontal cross sectional view of a construction 10 according to an embodiment of the present invention. The construction 10 may particularly be a wall or pillar or any other type of architectural structure.

The construction 10 comprises a supporting portion 12 and a covering portion 14 for covering the supporting portion 12. The supporting portion 12 may be provided by solid material pieces 16 and at least one string 18 for jamming at least some of the solid material pieces 16. The covering portion 14 comprises at least one covering device 20, preferably a plurality of covering devices 20. The string 18 and the covering devices 20 are attached to each other, which is described in more detail below.

The covering portion 14 is arranged around the supporting portion 12 on a plurality of sides of the supporting portion 12. In particular, the covering portion is arranged around the supporting portion 12 on vertically extending sides. The covering portion 14 may provide a cast for the supporting portion 12, particularly a cast for a compound of the solid material pieces 16 and the string 18 of the supporting portion 12.

It may be comprehended from FIG. 1 that the covering devices 20 are larger than the solid material pieces 16, and may also be made from a different material and/or have a different optical appearance than at least some of the solid material pieces 16 of the supporting structure 12. The solid material pieces 16 may particularly be provided as crushed rocks, angular rocks, granular stone material and/or broken stones. It is also possible that the solid material pieces 16 are made from and/or contain glass material and/or glass gravel and/or glass chippings. The solid material pieces 16 may be jammed and/or stamped and/or compressed, preferably for increasing a jamming effect.

As may further be comprehended from FIG. 1, the string 18 may be at least section wise laid within and/or throughout the supporting portion 12 and/or between the solid material pieces 16 and/or loosely laid and/or at least section wise tightened, preferably for increasing a jamming effect. The string 18 may be arranged in a pattern alternatingly running between a central area 22 of the supporting portion 12 and different covering devices 20.

The solid material pieces 16 of the supporting portion 12 may be compressed and/or stamped against the covering portion 14 and/or against the covering devices 20 and/or while being held and/or limited by the covering devices 20. At the same time, the covering portion 14 may allow shifting and/or movements of the solid material pieces 16. Furthermore, the covering portion 14 and/or the covering devices 20 may be fixed and/or held by the supporting portion 12, preferably by the compressed and/or stamped and/or jammed solid material pieces 16 and/or by the string 18, particularly by a compound made of the solid material pieces 16 and the string 18.

The covering devices 20 may be made of and/or comprise a stone and/or glass and/or metal material. As may be comprehended in more detail from FIG. 2, the at least one covering device 20 may comprise a visible side 24 facing away from the supporting portion 12 and furthermore a functional side 26 facing the supporting portion 12. The string 18 is attached to the covering device 20 at the functional side 26.

Figure 2:
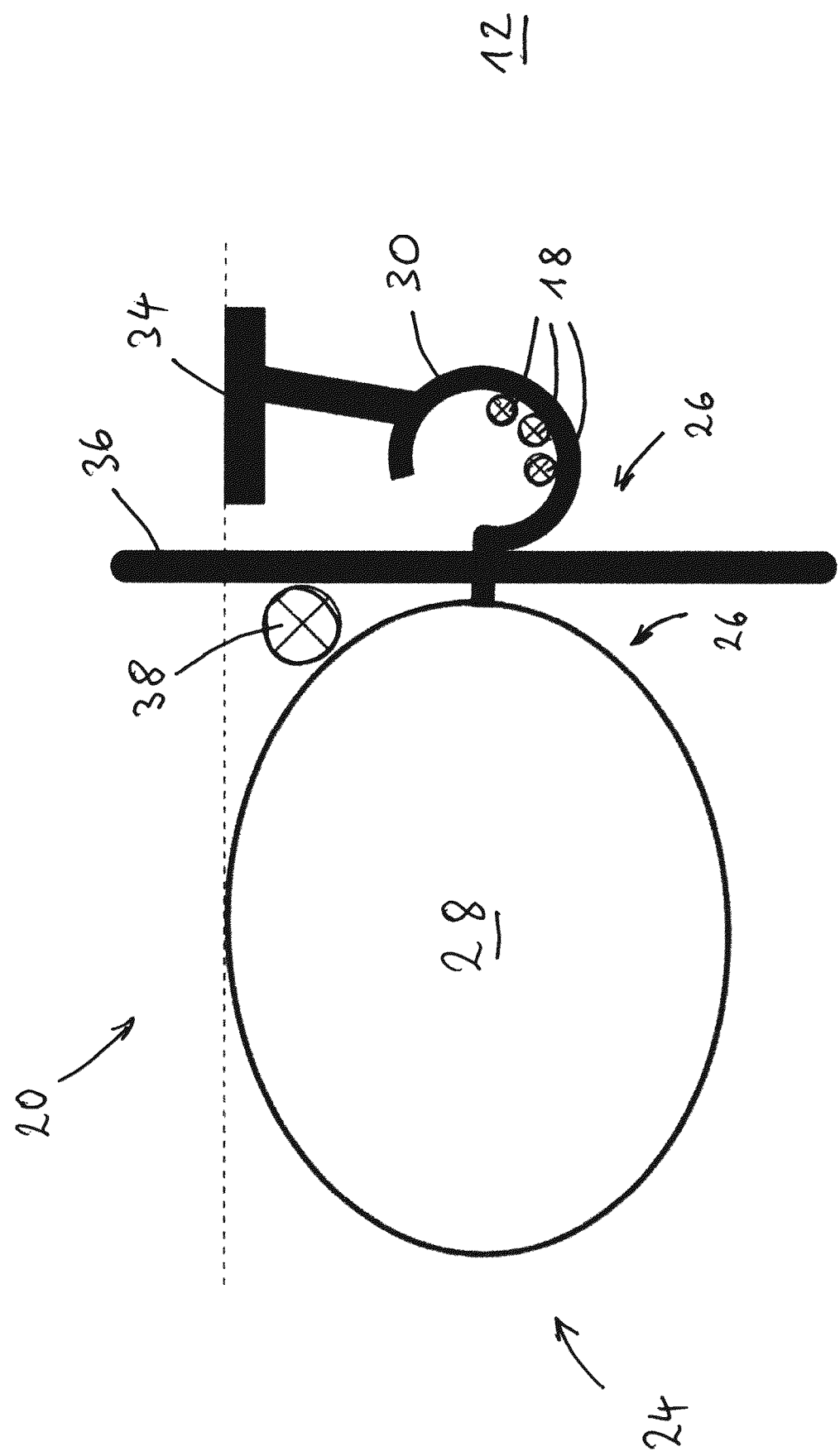
FIG. 2 shows a side view of a covering device according to an embodiment of the present invention.

The attachment between the string 18 and the at least one covering device 20 may be provided via a form fit and/or non-positive connection and/or via an adhesive. In the example of FIG. 2, the covering device 20 comprises at least one outer component 28 and an attachment element 30 for the attachment with the string 18. The attachment element 30 may be provided on the functional side 26, whereas the visible side 24 faces away from the attachment element 30. The attachment element 30 may be configured as a hook and/or eye and/or notch, to which the string 18 is attached and/or hooked.

As indicated in FIG. 2, the outer element 28 is arranged substantially on the same level as the attachment element 30. But is also possible that the outer element 28 is arranged below the attachment element 30 or the attachment level is arranged at least slightly or section wise above the outer element 28. Such arrangement may facilitate the dewatering of the construction. The covering devices 20 may accordingly be arranged on top of each other in the manner of scales. The construction may thus provide a bucket for plants in a preferred embodiment.

Figure 3:
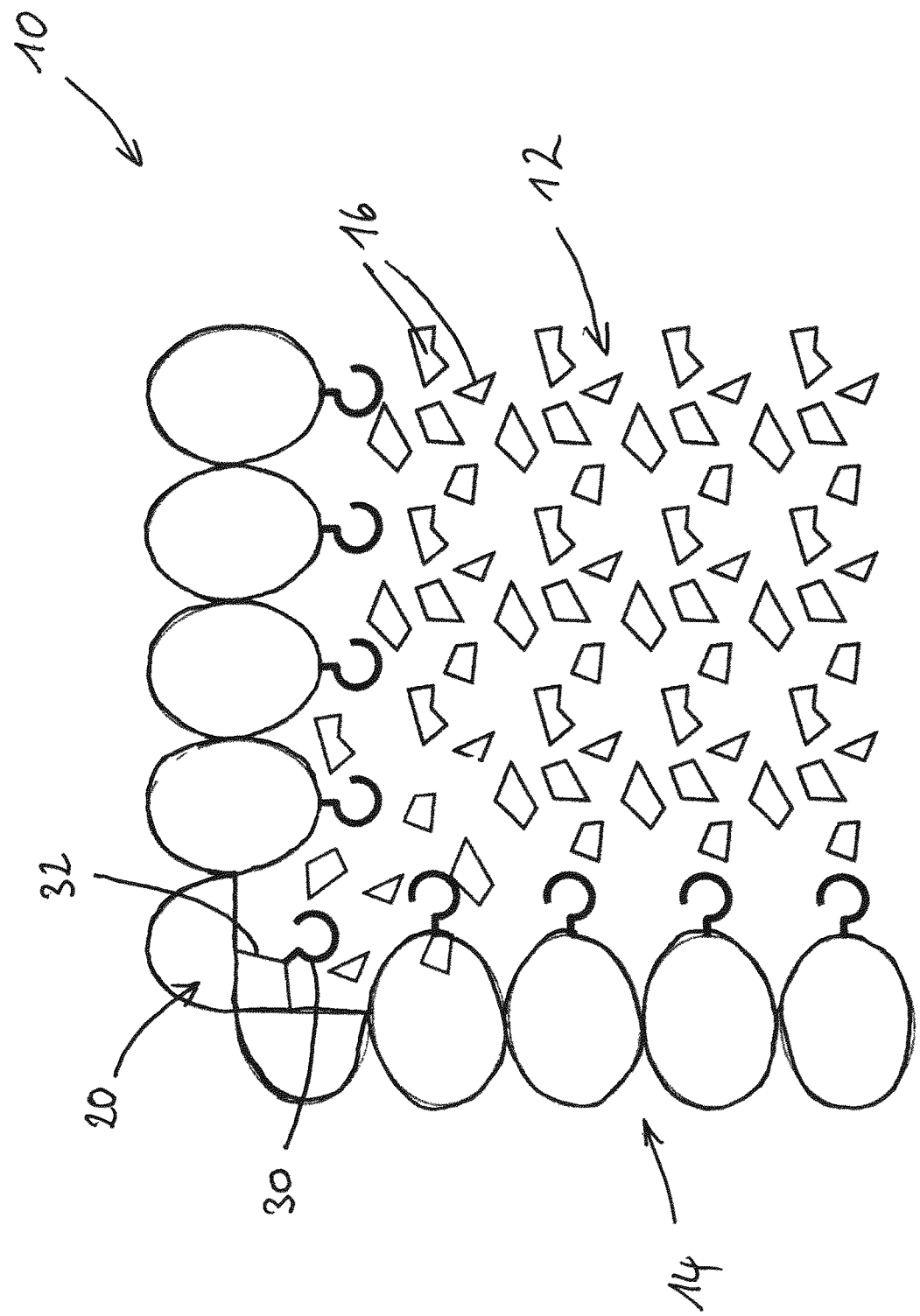
FIG. 3 shows a schematic horizontal cross sectional view of a construction according to a further embodiment of the present invention.
Figure 4:
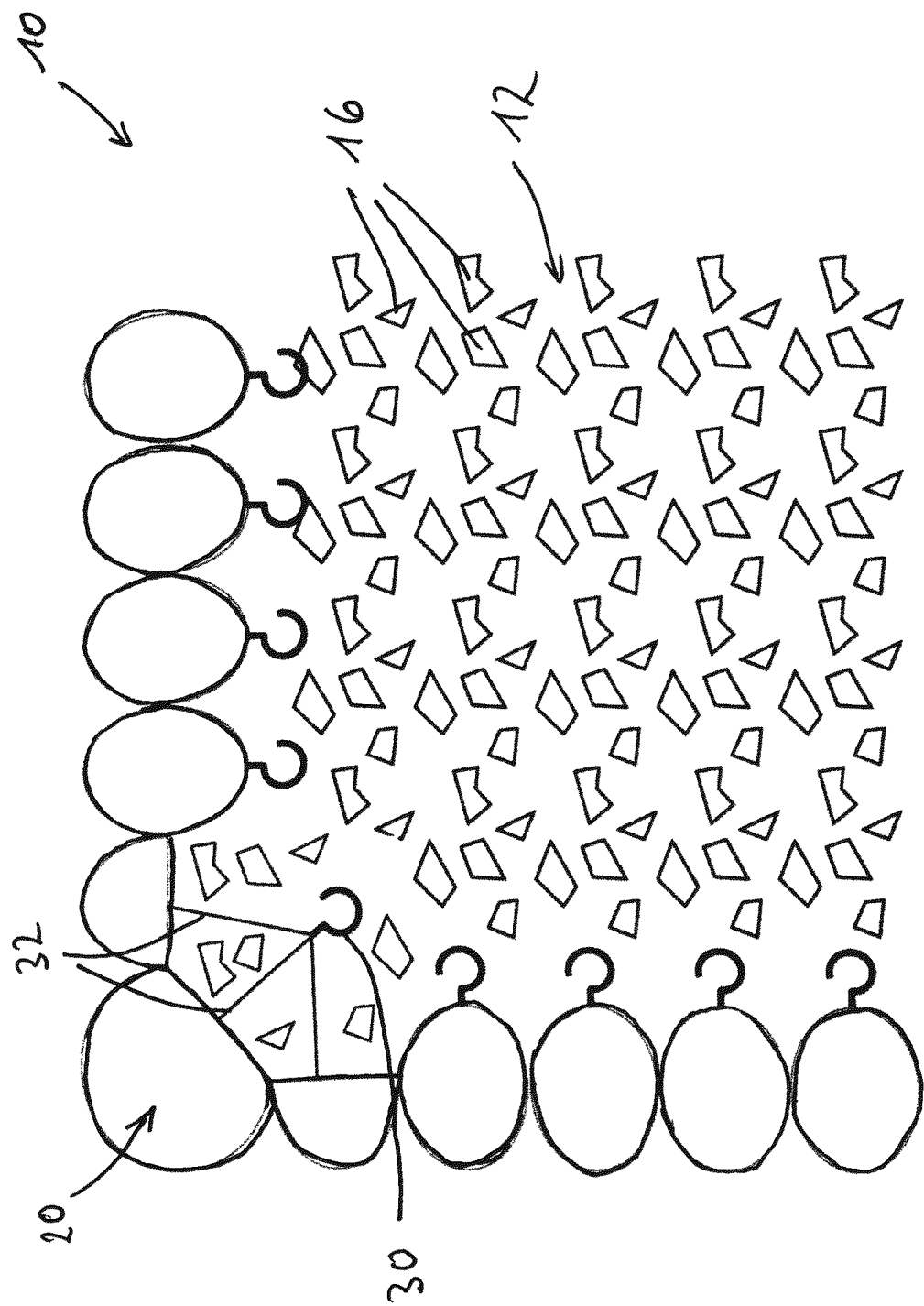
FIG. 4 shows a schematic horizontal cross sectional view of a construction according to a further embodiment of the present invention.

In the embodiments of FIGS. 3 and 4, at least one of the covering devices 20 comprises two or three outer components 28 being attached together via an interconnection 32. The interconnection may preferably provide an attachment element 30, to which the string 18 is attached and/or hooked. Accordingly, a covering device 20 may comprise several outer components 28, an interconnection 32 between the outer components 28 and an attachment element 30. Such covering device 20 may particularly be arranged in an edge position or form an edge or corner of the construction.

In case a covering device 20 for a corner or an edge comprises several outer components 28, the latter may be reduced in weight and/or size, for example, by cutting and/or by more than 20%, more than 30%, more than 40%, more than 50%, more than 60%, or more than 70% of their weight or size. In this way, such a covering device 20 with several outer components 28 may have the same weight as a covering device 20 with only one outer component 28.

As may furthermore be comprehended from FIG. 2, the at least one covering device 20 may comprise an identification device 34, preferably arranged on an attachment element 30. The identification device 34 may be preferably configured as flat platform and/or for detection by a sensor or visible for a human and/or configured with a position and/or orientation marker and/or a data code or device ID.

Furthermore, the at least one covering device 20 may comprise a shielding element 36 arranged on a functional side 26 facing the supporting portion 12. The shielding element 36 may be configured for maintaining a distance between the solid material pieces 16 of the supporting portion 12 and an outer component 28 of the covering device 20. The shielding element 36 may be arranged and/or fixed on the attachment element 30 of the covering device 20.

At least one illuminant 38, preferably a plurality of illuminants 38 and/or a light chain, may be arranged in a free space between the supporting portion 12 and a visible side 24 of the covering portion 14, preferably in a free space between the shielding element 36 and the outer component 28 of the covering device 20. Two adjacent covering devices 20 may be arranged at a distance from each other and/or a gap may be provided between two adjacent covering devices, such that light from the illuminant 38 may shine through said gaps.

Figure 5:
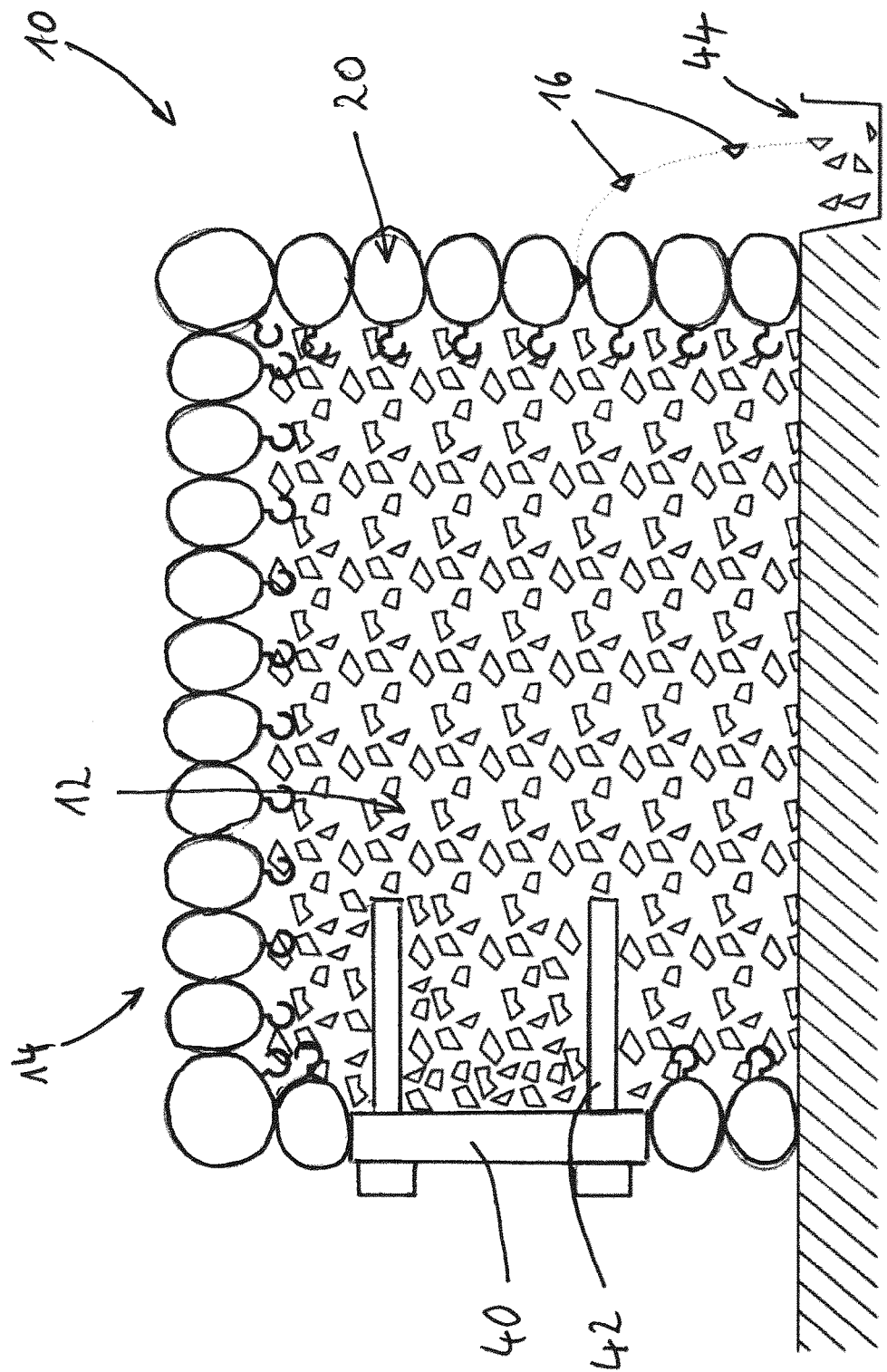
FIG. 5 shows a schematic vertical cross sectional view of a construction according to a further embodiment of the present invention.

Now referring to the embodiment in FIG. 5, the covering portion 14 may furthermore comprises a metal flange 40, preferably a metal flange 40 mounted to the supporting portion 12 and/or mounted to the supporting portion 12 subsequent to the building of the supporting portion 12. The metal flange may be mounted by at least one hook 42 being inserted into the supporting portion 12.

It may furthermore be comprehended from FIG. 5 that the construction 10 may comprise a sink 44. Solid material pieces 16 breaking and/or detaching from the supporting structure may fall through gaps between two adjacent covering devices 20 and into said sink 44. The solid material pieces 16 may remain in the sink 44 for decorative purposes.

Figure 6:
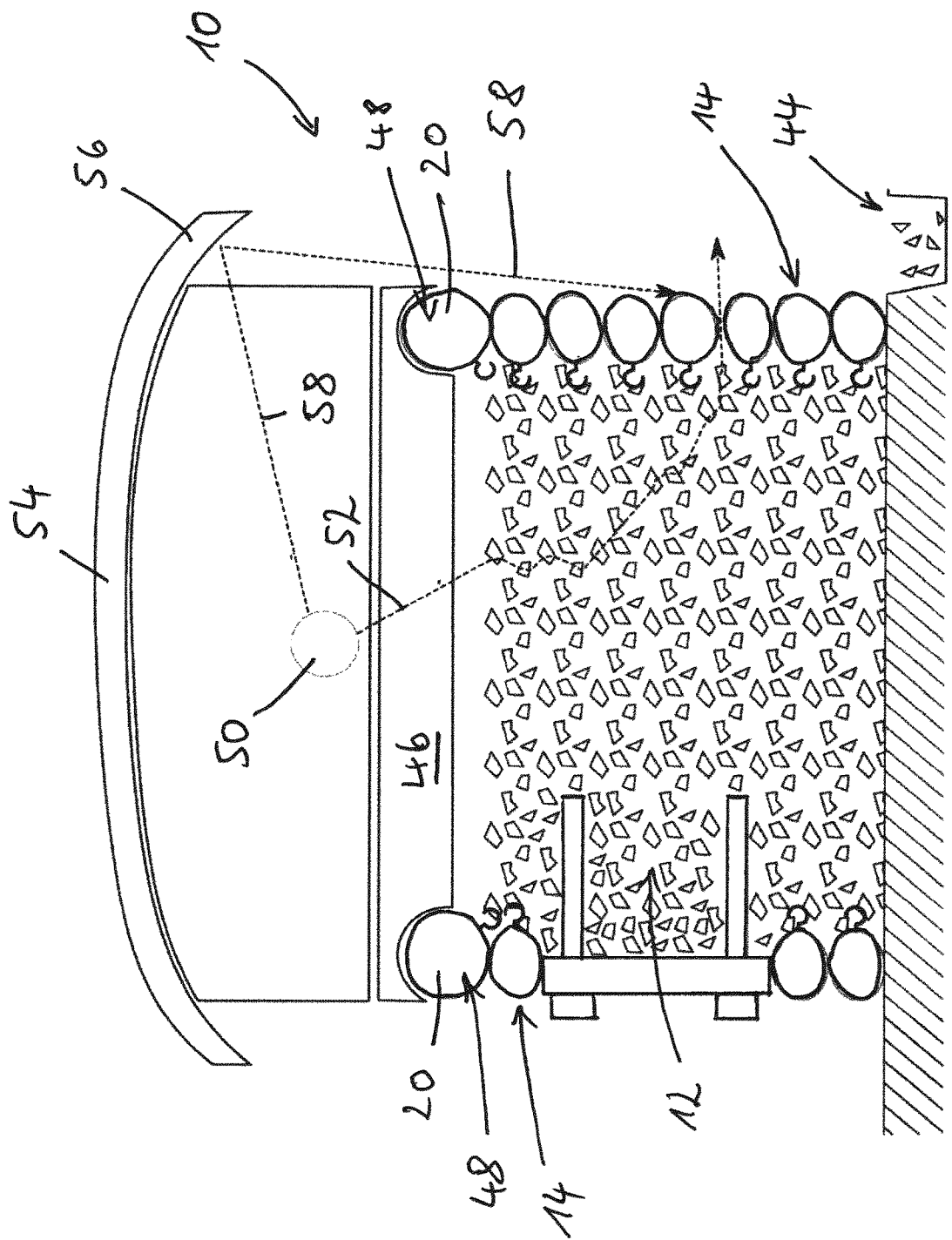
FIG. 6 shows a schematic vertical cross sectional view of a construction according to a further embodiment of the present invention from the side.

According to the embodiment in FIG. 6, the covering portion 14 may comprise a top cover portion 46 covering at least the supporting portion 12 from an upper side and/or being positioned on top of a vertically extending side cover portion 48 of the covering portion 14. The top cover portion 46 may be a 3D printed structure and/or printed as a negative form of the upper surface of the supporting structure 12 and/or the upper surface of the side cover portion 48. The top cover portion 46 may be configured as a flat platform, preferably for installation of a roof and/or a light source 50. The top cover portion 46 may be transparent, translucent and/or from a glass material and/or from frosted glass material.

As may be seen from FIG. 6, the light source 50 is installed on top of the top cover portion 46 in order to illuminate the supporting portion 12. The light path 52 may pass from the light source 50 into the supporting portion and out of the construction 10 via the covering portion 14, particularly via a side cover portion 48.

A mirror 54 may be installed on top of the supporting portion 12 and/or on top of the top cover portion 46 and/or on top of a light source 50, preferably for reflecting light into the supporting portion 12. The mirror 54 may have overhanging portions 56, preferably for reflecting light into the supporting portion 12 along an inner optical path 52 and/or for reflecting light onto the covering portion 14 from the outside, particularly along a light path 58 extending at least section wise outside the covering portion 14.

Figure 7:
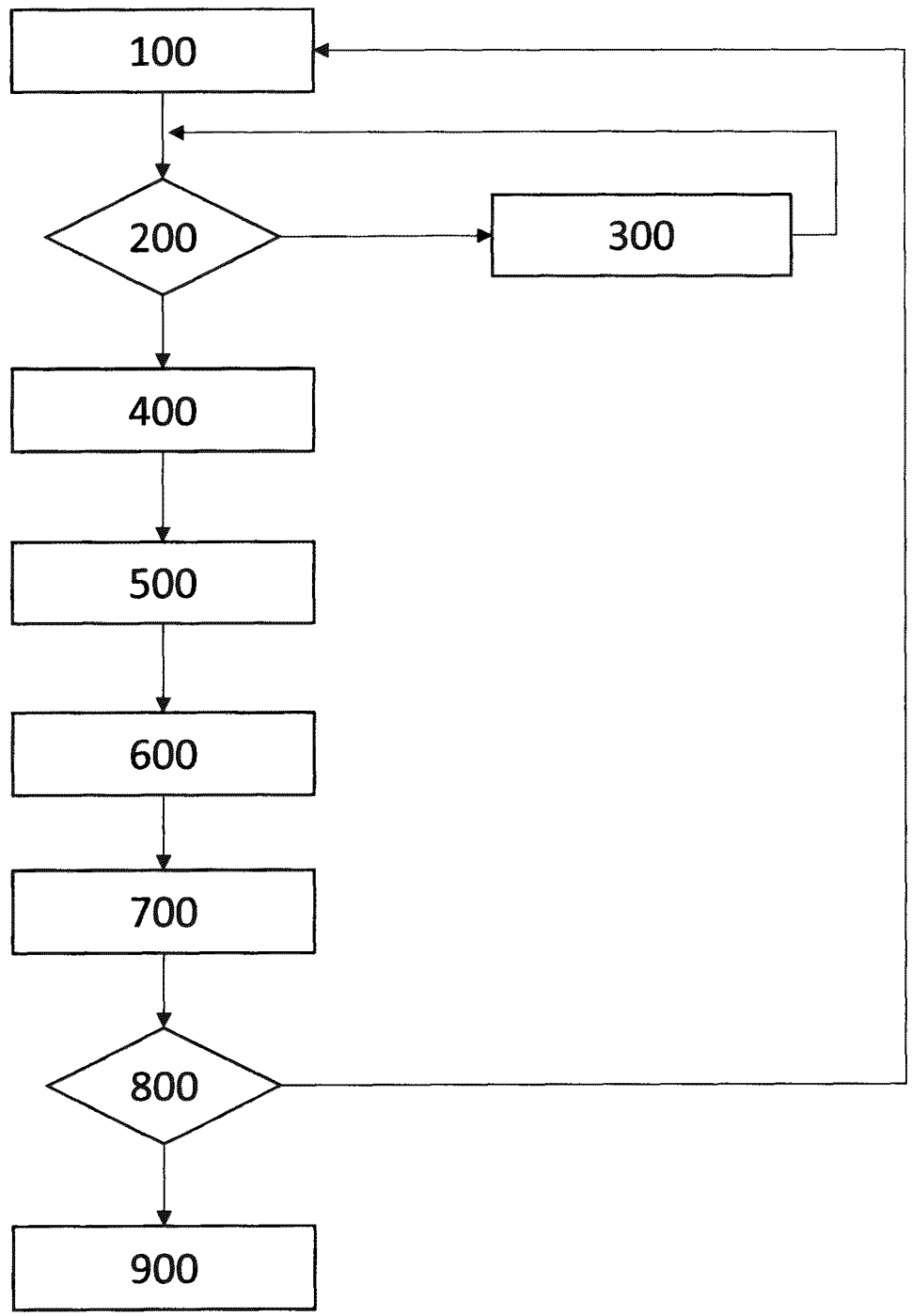
FIG. 7 shows a schematic flow diagram of a method according to an embodiment of the present invention.

FIG. 7 shows a schematic flow diagram of a method according to an embodiment of the present invention. In a first step 100, according to FIG. 7, a model of the construction may be sliced into horizontal layers, for example of 10 mm height or thickness. If a layer of the construction 10 is larger than the range of the human arm or possible robotic kinematics, it may also be sliced vertically into segments. A layer segment marks an intended layer area which shall be built, as shown in FIGS. 1, 3 and 4. The intended layer may be mapped to the real topology of the respective land or soil or ground.

According to step 200 in FIG. 7, the topology inside the intended layer area, that is, the area for the supporting portion 12, may be scanned. The topology may be appropriate, if the outer area of the intended layout area, that is, the area for the covering portion 14, is higher everywhere than the inner area. Thus, the inner area is having a cast surrounding. If this is not the case, the sections with lower outer area are identified and covering devices 20, such as large surface stones, for example, with a weight of 1.5 kg to 1.8 kg, may be loosely laid out in these sections according to step 300. In a preferred solution, the covering device 20 may be designed in accordance with FIG. 2.

In step 400 shown in the diagram of FIG. 7, a string 18 may be laid out. The laying pattern for the string 18 can be random. The process step 400 may be finished, when all covering devices 20 are connected to a string 18 of that layer. To connect a string 18 to covering devices 20, the string 18 may be first being laid out to the centre region 22 of the intended area. Then, it is moved indirectly with some random patterns towards covering device 20. The string is then connected to the covering device 20.

In a preferred solution, the respective string 18 may be hooked into the attachment element 30 shown in FIG. 2, and then laid back randomly to the centre region 22. This is repeated with the next covering device 20. In a preferred solution, it may be any other covering device 20, but not a covering device 20 directly adjacent to one that has been connected before.

After all covering devices 20 are connected to the string 18, the string 18 is laid to the centre region 22. Preferably, the string 18 is not cut off, but held in a waiting position above the intended layer.

According to step 500, a layer of solid material pieces 16 is being placed above the string 18. In a preferred solution, stones with edges and size of 6 mm to 12 mm are filled in, until about 50% to 90%, preferably 80%, of the string 18 becomes hidden. Preferably, solid material pieces 16 are placed behind every covering device 20, without pushing the string 18 straight downwards. Instead, the string 18 shall continue to be directed towards the centre region 22.

According to step 600, the compound of string 18 and solid material pieces 16 is stamped to reduce its packaging size and for the string 18 to be held tight by the solid material pieces. This stamping also increases the jamming effect. A hitting surface of an appropriate stamping tool may preferably be flat and the stamping force may be applied to the entire area to be stamped at the same time.

The applied stamping force might have displaced some of the covering devices 20. According to step 700, such covering devices 20 may be repositioned by pushing them back to the assigned position.

In step 800 it is checked whether or not the last layer has been generated, and if not, the procedure is being repeated for the next intended layer. In case the last layer has been generated the process is terminated in step 900.

In a preferred embodiment, step 400 is being extended by more sub-steps. Before the string 18 is laid out, a chain of lights may be laid out along the functional side 26 of the covering devices 20, see FIG. 2. Another sub-step could be that different strings 18 are applied at different locations of an area. If an area is exposed to heat of fire, the respective string 18 needs to be designed as iron wire or other resistant material. If the user wishes a segment of the construction 10 to decompose naturally, a decomposable rope should be applied as string 18. If a lasting construction 10 is requested by a user a recycled rope of long-lasting material should be applied as string 18. Also a string 18 made of carbon fibre and recycled rope would be possible. Natural rope would be useful as string 18, if an ecological construction 10 is intended which attracts a diversity of animals and/or plants.

In a preferred solution, the covering devices 20 are sorted according to different parameters, such as the form. The form of neighbouring covering devices 20 may match in order to minimize the gap in between. However, gaps can also be applied as a design feature.

For example, if illuminated, gaps can become a main design element. To control the form of the gap, it may be necessary to choose the right covering devices 20 from a pool of sorted and/or digitalized covering devices 20. As the covering devices 20 may create a grid of gaps, almost every shape could be illuminated if the right lights would be activated.

It would be a favourable to apply covering devices 20 with a certain degree of transparency or translucence, so they can become illuminated. In that case, the covering devices would need to be sorted according to their transparency or translucence and shining effects. The centre of mass of a covering device 20 may be another sorting criteria. As the covering devices 20 are laid out loosely on top of covering devices 20, there is a risk of dropping off. Spherical stones may have the highest probability to drop, whereas flat stones have a lower probability and long and flat stones have a much lower probability to drop. So, if it is intended to build a wall structure with overhanging wall segments then long and flat stones should be chosen for these segments. Thus, each layer would be slightly overhanging towards the layer below and the surface stones could still be laid loosely, before connected to the string 18.

The jamming effect may stabilize against induced pressure from top, but not so much from force applied from sides. To secure the construction 10 against forces induced from a side it may be possible to integrate rigid and/or fixed elements—not shown here—to the construction 10. These could be already existing elements from an old wall or fence or it could be a pile or post which is tied to and/or embedded in the ground or soil. In a preferred solution, such rigid and/or fixed elements may be equipped with connection areas for the string 18, for example hooks. The rigid and/or fixed element may then be enclosed by the supporting portion 12 during the build process. The string 18 may be laid around the rigid or fixed element from all sides is connected to the rigid or fixed element and therefore fixed. To make sure, that the jamming effect of the compound is not being impaired by rigid or fixed elements, the elements should be enclosed everywhere by the compound of the supporting portion 12 with a thickness of at least ten solid material pieces or stones of the compound.

In a preferred solution, a segment of the construction can be used as a fireplace. A typical disadvantage of fireplaces is that solid burning material is laid out mainly horizontally. But the users are sitting aside of the fireplace and therefore the largest surface of the burning material not being presented to the user. While this might be of minor importance during a burning phase with high flames, it becomes relevant in the long lasting glowing phase of the burning material. To present the glowing material vertically to the user and to send out most of the heat radiation directly to the user, it is required to fix the burning material vertically. To achieve that, the compound material of the supporting portion may be provided not from stones but from charcoal and iron wire as a string. Through this, charcoal pieces can be fixed vertically. In a preferred solution, an iron frame which may comprise a door and a heat resistant window may be mounted in front of the charcoal. The glass may have a distance of 20 mm to the charcoal. Through this, smoke may leave the space between coal and glass by the chimney effect to above and the glass becomes hot enough for smoke residues to dissolve and vanish.

Figure 8:
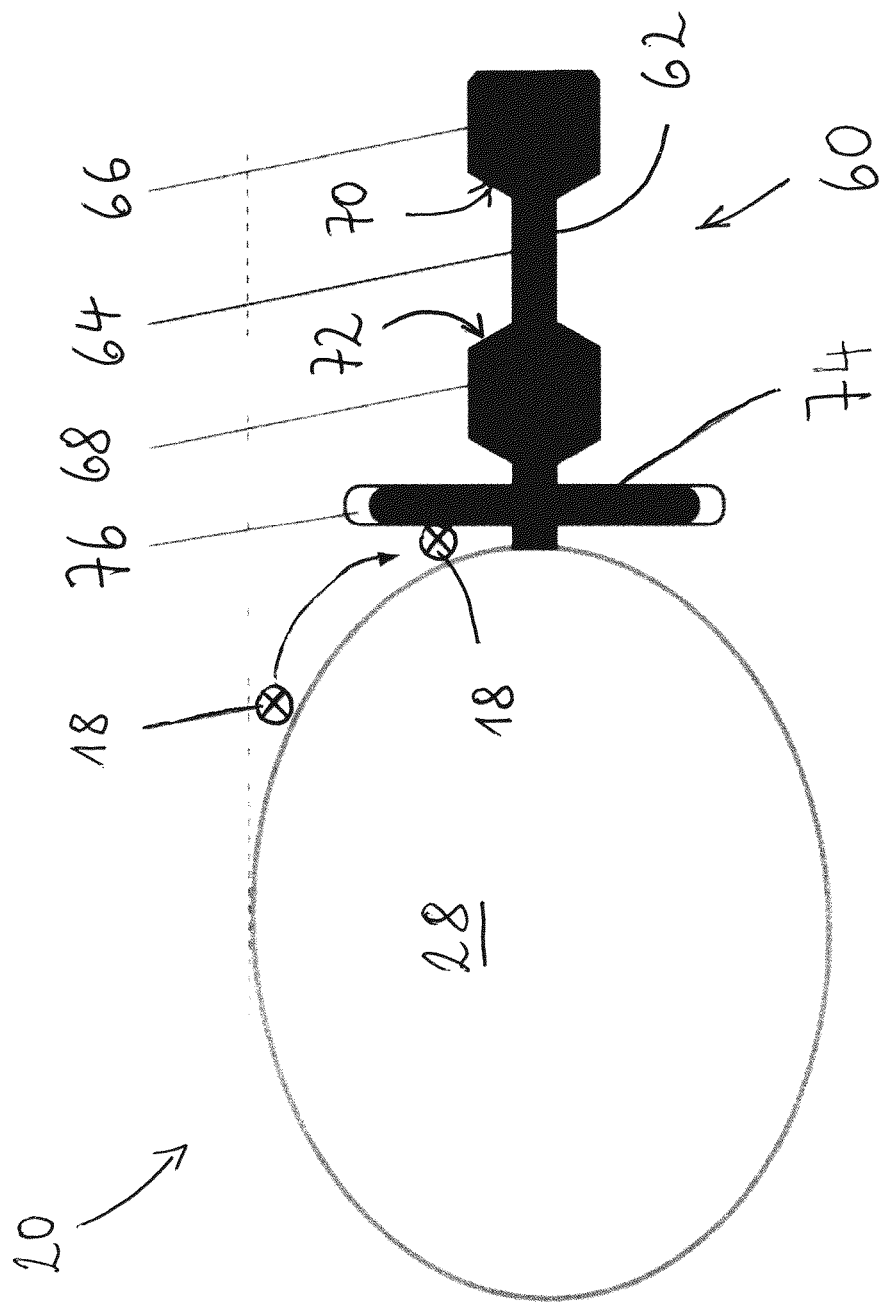
FIG. 8 shows a schematic sectional view of a covering device according to an embodiment of the present invention.

FIG. 8 shows a schematic sectional view of a covering device 20 according to an embodiment of the present invention. The covering device 20 shown in FIG. 8 comprises an outer component 28 and an attachment element 60 and for the attachment with the string 18. The attachment element 60 is configured as and/or comprises a screw 62, wherein the screw is preferably configured as a concrete screw. The screw 62 may be screwed into the outer component 28, preferably free of any dowel or screw anchor.

The screw 62 may comprise a shaft 64 and a screw head 66 attached to the shaft 64. The shaft 64 may comprise a protrusion 68, particularly a radial protrusion, being arranged at a distance from the screw head 66 in a longitudinal direction of the shaft 64, wherein the shaft 64 and/or the protrusion 68 and/or the screw head 66 may provide a gripping portion for a robot and/or gripping device.

The screw head 66 may be provided with insertion chamfers 70 and/or the protrusion 68 may be provided with insertion chamfers 70, wherein insertion chamfers 70 and 72 face each other in the longitudinal direction of the shaft 64. The insertion chamfers 70 and 72 may be provided for accurate and/or facilitated gripping and alignment of the covering device 20 by a robot or gripping device.

Figure 9:
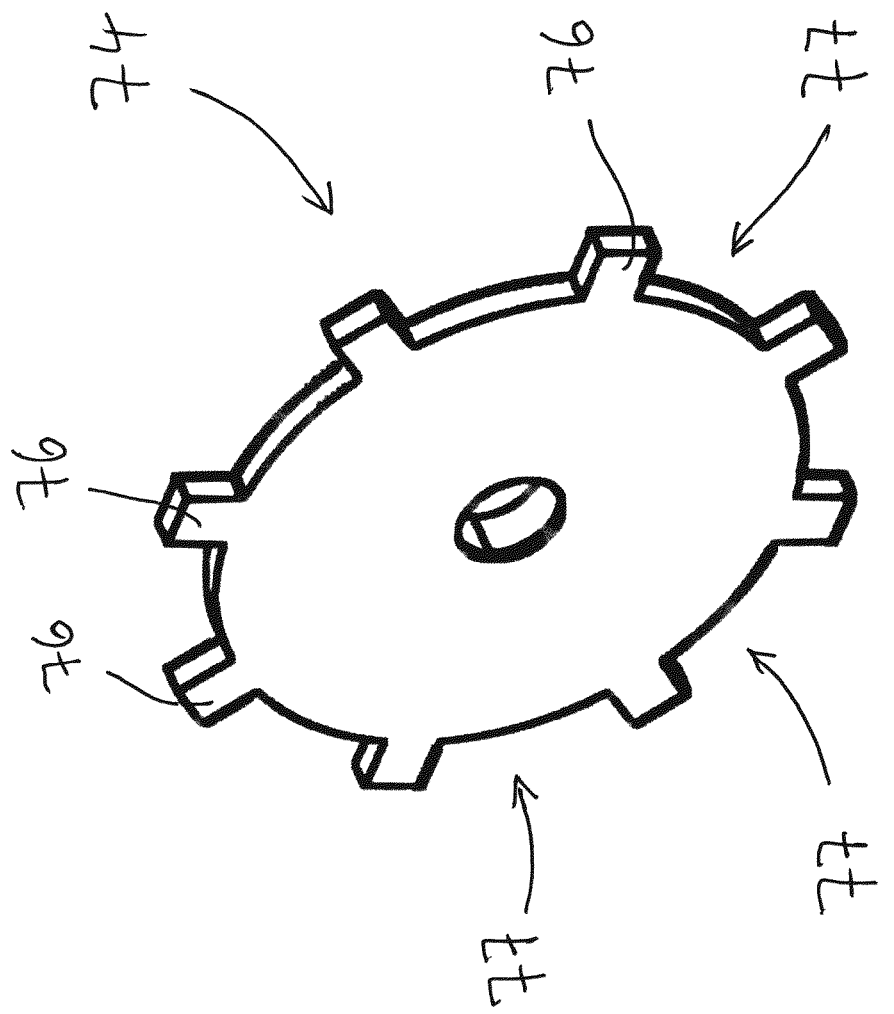
FIG. 9 shows a schematic perspective view of a disc of a covering device according to an embodiment of the present invention.

Furthermore, the attachment element 60 may comprise a disc 74 for engagement by the string 18. FIG. 9 shows a schematic perspective view of the disc 74.

As shown in FIGS. 8 and 9, the disc 74 comprises a plurality of teeth 76 arranged on the outer circumference of the disc 74, wherein the teeth 76 are configured for engagement and/or locking and/or trapping engagement with the string 18. Recesses 77 are provided between two adjacent teeth 76. In case of engagement of the string 18 with a tooth, the string may be arranged within one of the recesses 77.

The disc 74 may be arranged on the shaft 64 of a screw 62, preferably at distance from the outer component 28 and/or between the outer component 28 and the screw head 66 and/or between the outer component 28 and the protrusion 68. The string 18 may thus slide into a gap between the outer component 28 and the disc 74, and when pulled due to a jamming or compressing procedure, may be engaged with teeth 76 of the disc 74 with sufficiently high probability.

Figure 10:
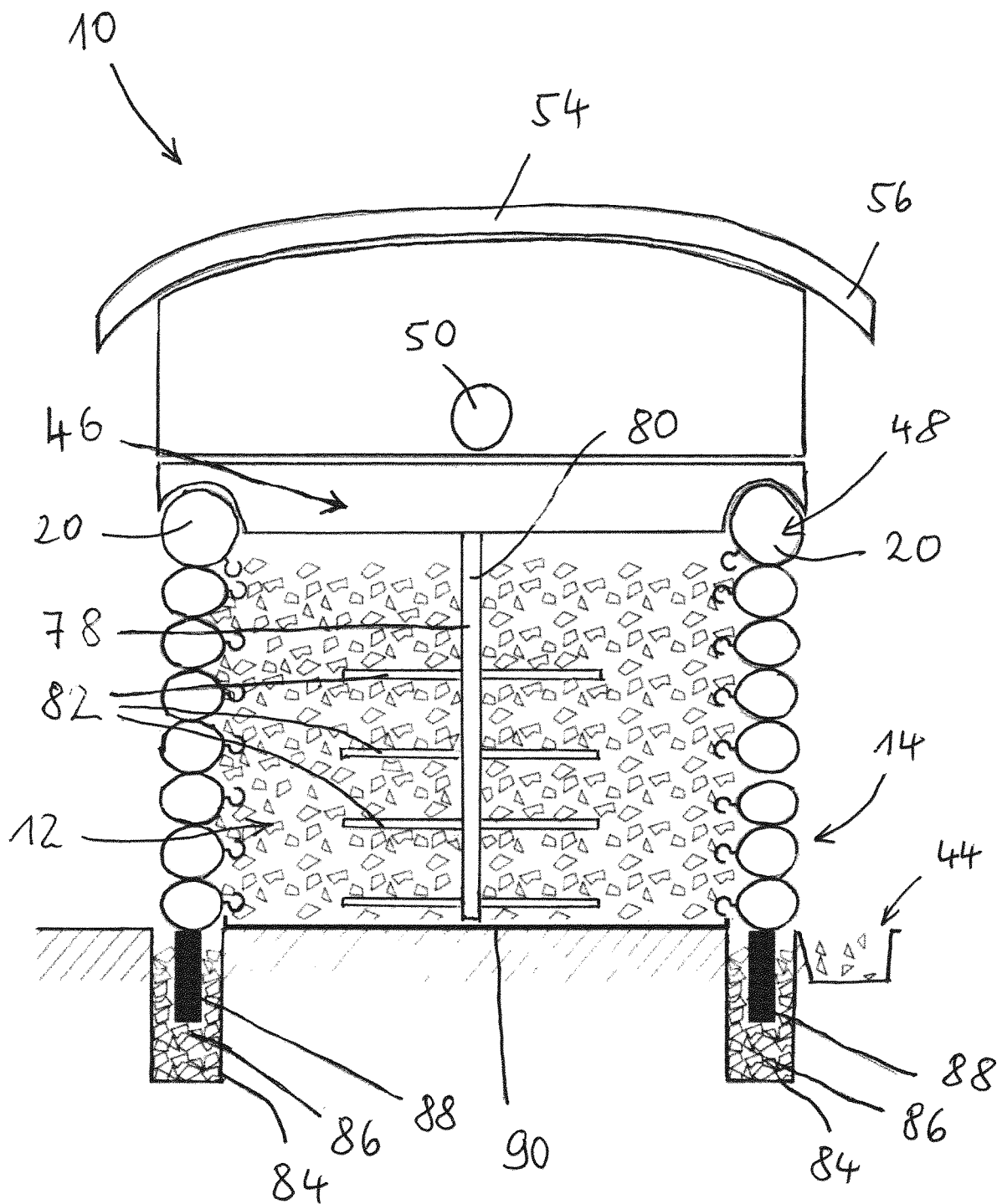
FIG. 10 shows a schematic vertical cross sectional view of a construction according to a further embodiment of the present invention from the side.

FIG. 10 shows a schematic vertical cross sectional view of a construction 10 according to a further embodiment of the present invention from the side. According to FIG. 10, the supporting portion 12 and the covering portion 14 enclose a fence 78, preferable a fence 78 comprising a double rod mat 80 attached by clamping elements to a solid pile (not shown here in detail) arranged within the respective soil or ground. Horizontally extending supporting elements 82 are attached to the double rod mat 80. The supporting elements 82 may be configured for supporting solid material pieces 16 of the supporting portion 12 and transferring their weight load to the double rod mat 80 of the fence 78.

The horizontally extending supporting elements 82 may be provided by a weatherproof upper portion and a dissolving or degradable lower portion, the dissolving or degradable lower portion being configured for the development of cavities below the supporting elements 82 for improved weight load transferral to the double rod mat 80.

The double rod mat 80 of the fence 78 may be attached to the top cover portion 46 for transferring a weight load via the top cover portion 46 to the covering portion 14, in particular to vertical sides of the cover portion 14.

For building a construction 10 according to the embodiment in FIG. 10, the clamping elements of the fence 78 are release and the double rod mat 80 of the fence 78 is being moved several centimetres higher, for example 5 cm.

To hold the double rod mat 80 in the new position, an additional, non-permanent device (not shown here) may be applied to lock the double rod mat 80 in its elevated position. Such device can be any device which is suitable to unlock, after the construction is finalized, such as a cardboard base below the fence 78 or double rod mat 80, which dissolves when watered.

The clamping elements of the fence 78 remain loose to not enable linear motion of the double rod mat 80 in the vertical direction, but still locking it to the respective pile in the horizontal directions. Horizontal supporting elements 82 are now being attached to the fence double rod mat 80. When the construction 10 is being built, a considerable part of the weight of the supporting portion 12, respectively the solid material pieces 16, is loaded on the horizontal supporting elements 82.

As mentioned above, the horizontally extending supporting elements 82 consist of a solid part on the upper side and a non-permanent part on the lower side. The non-permanent part may dissolve after the construction is finished. They may also consist of cardboard or other material, which dissolves entirely when watered. The function of the nonpermanent material is to prevent the solid material pieces 16 to allocate the space on the lower side of horizontal supporting elements 82.

The function of the horizontal supporting elements 82 is to carry the weight load of the supporting portion 12 as soon as all non-permanent elements dissolve, or at least a high portion of that load, e.g. 50% or 70% or 80%. The force of that static load is then passed to the double rod mat 80. The double rod mat 80 is permanently attached to the top cover portion 46. Consequently, top cover portion 46 is loaded with the weight and passes that weight directly to the outer covering portion 14, that is, the side part of the covering portion 14.

The covering devices 20 are thus being loaded at least with part of the weight of the supporting portion 12. Therefore, the covering devices 20 in the upper rows are locked by the weight load of the supporting portion 12, as soon as all nonpermanent elements or portions dissolve and the construction 10 settles to an enduring and final solid state.

In a preferred solution as also shown in FIG. 9, the outer covering portion 14 grounds on a furrow 84 which may be about 40 cm deep into the ground or which may have a depth of about ⅓ of the height of the construction 10.

The furrow 84 may comprise stamped solid material pieces 86, and optionally also a solid foundation element 88. The solid foundation element 88 may be embedded in the solid material pieces 86 and may be provided as a curbside or a plastic element.

In order to prevent drainage water flowing through the solid material pieces 16 from entering the ground between the two furrows 84, a drip pan 90 may be applied below the supporting portion 12 for catching the water and other residues.

The invention claimed is:

1. A structure, comprising:
   a supporting portion (12); and
   a covering portion (14) for covering the supporting portion (12),
   the supporting portion (12) being provided by solid material pieces (16) and at least one string (18) for jamming at least some of the solid material pieces (16),
   wherein the at least one string (18) is at least section wise laid within and throughout the supporting portion (12) in a non-linear fashion and is bent or curved at least section wise around the solid material pieces (16), wherein the string (18) is flexible and limp in a non-tensioned state and remains at least section wise curved or bent in a tensioned state in order to provide a jamming effect,
   wherein the covering portion (14) comprises at least one covering device (20),
   wherein the at least one string (18) and the covering device (20) are attached to each other, and
   wherein the at least one covering device (20) is fixed and held by a compound made of the jammed solid material pieces (16) and the at least one string (18).

2. The structure according to claim 1, wherein the structure is a wall or a pillar.

3. The structure according to claim 1, wherein the covering portion (14) is arranged around the supporting portion (12) and/or on a plurality of sides of the supporting portion (12), and/or
   wherein the covering portion (14) provides a cast for the supporting portion (14).

4. The structure according to claim 3, wherein the covering portion is arranged on vertically extending sides of the supporting portion.

5. The structure according to claim 3, wherein the covering portion provides a cast for the compound of the solid material pieces and the at least one string of the supporting portion.

6. The structure according to claim 1, wherein:
   the at least one covering device (20) is made from a different material and/or has a different optical appearance than at least some of the solid material pieces (16) of the supporting structure (12); and/or
   the at least one covering device (20) has a larger size than an average solid material piece (16) of the supporting structure (12); and/or
   the at least one covering device (20) has a higher surface quality and/or smoothness than the solid material pieces (16) of the supporting portion (12).

7. The structure according to claim 1,
   wherein the at least one string (18) is at least section wise laid between the solid material pieces (16) and/or at least section wise tightened for increasing a jamming effect, and/or
   wherein the covering portion (14) comprises a plurality of covering devices (20) and the at least one string (18) is arranged in a pattern alternatingly running between a central area (22) of the supporting portion (12) and different instances of the plurality of the covering devices (20).

8. The structure according to claim 1, wherein the solid material pieces (16) are one or more of:
   compressed against the covering portion (14);
   stamped against the covering portion (14);
   compressed against the at least one covering device (20);
   stamped against the at least one covering device (20);
   held by the at least one covering device (20);
   limited by the at least one covering device (20); and/or
   wherein the covering portion (14) allows shifting and/or movements of the solid material pieces (16).

9. The structure according to claim 1, wherein:
   the attachment between the at least one string (18) and the at least one covering device (20) is provided via any of:
   a form fit;
   a non-positive connection;
   via an adhesive; and
   in that the at least one covering device (20) comprises at least one outer component (28) or a plurality of outer components (28) and at least an attachment element (30; 60) and/or attachment portion for the attachment with the at least one string (18),
   wherein the outer component comprises a visible side (24) facing away from the supporting portion (12) and/or a functional side (26) facing the supporting portion (12), the attachment element (30) and/or attachment portion being arranged on the functional side (26).

10. The structure according to claim 1, wherein the at least one covering device (20) comprises:
    an identification device (34) arranged on an attachment element (30) and/or attachment portion,
    wherein the identification device (34) is configured as any of:
    a flat platform;
    for detection by a sensor or visible for a human;
    a flat platform for detection by a sensor or visible for a human;
    having a position marker;
    having an orientation marker; having a data code; and having a device ID.

11. The structure according to claim 1, wherein:
the supporting portion (12) and/or the covering portion (14) comprise basalt material and/or dunite or olivine material, and/or
in that a plurality of solid material pieces (16) of the supporting portion (12) and/or covering devices (20) of the covering portion (14) are:
made of basalt rock and/or dunite or olivine material and/or covered by basalt material and/or dunite or olivine material, and/or
exposed to air and/or wherein the basalt material and/or dunite or olivine material is exposed to weathering, and/or
configured for weathering and removing carbon dioxide from the atmosphere.

12. The structure according to claim 1, wherein at least some of the solid material pieces (16) and/or covering devices (20) of the covering portion (14) are covered with powder of basalt rock and/or dunite or olivine material.

13. The structure according to claim 12, wherein the powder of basalt rock and/or dunite or olivine material has a grain size of more than 5 micrometers.

14. The structure according to claim 13, wherein the powder of basalt rock and/or dunite or olivine material has a grain size of less than 50 micrometers.

15. The structure according to claim 12, wherein the powder of basalt rock and/or dunite or olivine material is attached to the solid material pieces (16) and/or the covering devices (20) of the covering portion (14) by one or more of:
a slurry;
a gel; and
a glue material;
wherein
the slurry, and/or gel, and/or glue material is permeable for air;
the slurry, and/or gel, and/or glue material are configured for dissolving in a timeframe between 6 months and 18 months; or
the slurry, and/or gel, and/or glue material are both permeable for air and configured for dissolving in a timeframe between 6 months and 18 months.

16. The structure according to claim 1, wherein:
a basalt powder or dunite or olivine powder material is formed to particles of a size of at least 0.5 mm and less than 10 mm; and
these particles are arranged within the supporting portion (12) and/or the covering portion (14).

17. The structure according to claim 1, wherein the supporting portion (12) and/or the covering portion (14) and/or a top cover portion (46) comprises:
at least one pipe, filling opening, and/or tank for filling:
rock particles, and/or
a slurry, and/or
gel, and/or
glue material with rock material,
the at least one pipe, filling opening, and/or tank configured for:
filling rock particles at an upper portion of the supporting portion (12), and/or
the covering portion (14) and/or the top cover portion (46), and/or
for distributing the rock particles throughout the supporting portion (12) and/or the covering portion (14) by a stream of liquid.

18. A method for generating the structure of claim 1, the method comprising the steps of:
providing the covering portion (14) with the at least one covering device (20);
providing the supporting portion (12) by placing the compound of the solid material pieces (16) and the at least one string (18) adjacent to the at least one covering device;
wherein the at least one string (18) is at least section wise laid within and throughout the supporting portion (12) in a non-linear fashion and bent or curved at least section wise around the solid material pieces (16), the at least one string (18) being flexible and limp in a non-tensioned state and remaining at least section wise curved or bent in a tensioned state in order to provide a jamming effect, and
attaching the string (18) to the at least one covering device (20), the at least one covering device (20) being fixed and held by the compound made of the solid material pieces (16) and the string (18).

* * * * *